US012134105B2

(12) United States Patent
Kappel et al.

(10) Patent No.: US 12,134,105 B2
(45) Date of Patent: Nov. 5, 2024

(54) COATING DEVICE AND METHOD USING ROLLERS

(71) Applicant: Contiweb B.V., Boxmeer (NL)

(72) Inventors: Sjoerd Kappel, Boxmeer (NL); Michiel Van Der Meulen, Boxmeer (NL); Robbert Wind, Boxmeer (NL)

(73) Assignee: Contiweb B.V., Boxmeer (NL)

( * ) Notice: Subject to any disclaimer, the term of this patent is extended or adjusted under 35 U.S.C. 154(b) by 115 days.

(21) Appl. No.: 17/776,850

(22) PCT Filed: Nov. 20, 2020

(86) PCT No.: PCT/IB2020/060967

§ 371 (c)(1),
(2) Date: May 13, 2022

(87) PCT Pub. No.: WO2021/100008

PCT Pub. Date: May 27, 2021

(65) Prior Publication Data

US 2022/0388021 A1 Dec. 8, 2022

(30) Foreign Application Priority Data

Nov. 21, 2019 (NL) ...................................... 2024281

(51) Int. Cl.
*B05C 1/08* (2006.01)
*B05D 1/28* (2006.01)
(Continued)

(52) U.S. Cl.
CPC .............. *B05C 1/0834* (2013.01); *B05D 1/28* (2013.01); *B41F 19/001* (2013.01); *B41F 23/08* (2013.01); *B41M 7/0036* (2013.01)

(58) Field of Classification Search
None
See application file for complete search history.

(56) References Cited

U.S. PATENT DOCUMENTS 3,814,054 A * 6/1974 Tajihi ........................ G03D 5/06 492/37
5,028,457 A * 7/1991 Kinose ..................... B05D 1/28 118/224

(Continued)

FOREIGN PATENT DOCUMENTS

EP 2749359 A1 7/2014
EP 3132860 A1 2/2017

(Continued)

OTHER PUBLICATIONS

International Search Report and Written Opinion, PCT Application No. PCT/IB2020/060967, mailed Mar. 22, 2021 (11 pages).

*Primary Examiner* — Jethro M. Pence
(74) *Attorney, Agent, or Firm* — Occhiuti & Rohlicek LLP

(57) ABSTRACT

A coating device, comprising a supply roller having a first contact surface, and a counter-roller placed opposite the supply roller and a second contact surface substantially parallel to the first contact surface. The contact surfaces are at least a substrate width in width and maintain a mutual gap for receiving the substrate therein in contact with both contact surfaces. The supply roller and counter-roller are each rotatable about their central axis. A liquid is supplied to the supply roller. At least the contact surface of the supply roller or the counter-roller is axially adjustable along the central axis thereof. Adjusting means align an edge of the contact surface of the supply roller and the counter-roller with a side of the substrate. An opposite edge of the other of the supply roller and the counter-roller is aligned with an opposite side of the substrate.

16 Claims, 2 Drawing Sheets

(51) Int. Cl.

| | |
|---|---|
| ***B41F 19/00*** | (2006.01) |
| ***B41F 23/08*** | (2006.01) |
| ***B41M 7/00*** | (2006.01) |

(56) References Cited

U.S. PATENT DOCUMENTS

| | | | | |
|---|---|---|---|---|
| 5,709,747 | A * | 1/1998 | Goldwasser | D04H 1/42 118/263 |
| 5,755,883 | A * | 5/1998 | Kinose | B05C 1/0813 118/259 |
| 6,706,118 | B2 * | 3/2004 | Heink | B05C 1/0834 118/704 |
| 9,341,974 | B2 * | 5/2016 | Numata | G03G 15/01 |
| 9,440,457 | B2 * | 9/2016 | Gazit | B41F 23/08 |
| 11,130,350 | B2 * | 9/2021 | Nozawa | B41J 2/2114 |
| 2013/0249995 | A1 * | 9/2013 | Furukawa | B41J 2/01 118/262 |
| 2014/0023791 | A1 | 1/2014 | Peleg et al. | |
| 2020/0307163 | A1 * | 10/2020 | Kim | B05D 3/102 |

FOREIGN PATENT DOCUMENTS

| | | | |
|---|---|---|---|
| EP | 3476494 | A1 | 5/2019 |
| WO | 2013160289 | A1 | 10/2013 |
| WO | 2014063731 | A1 | 5/2014 |

* cited by examiner

COATING DEVICE AND METHOD USING ROLLERS

CROSS REFERENCE TO RELATED APPLICATIONS

This application is a 371 National Stage application of PCT Application No. PCT/IB2020/060967, filed Nov. 20, 2020, which claims priority to Netherlands Application No. 2024281, filed Nov. 21, 2019, the contents of both of which are incorporated herein by reference in their entireties.

The present invention relates to a coating device for supplying a liquid to a substrate, particularly in the form of an optionally printed web, foil, strip or sheet, comprising a supply roller having over a periphery thereof a first contact surface, and a counter-roller placed opposite the supply roller and having over a periphery thereof a second contact surface substantially parallel to the first contact surface, which contact surfaces are at least a substrate width in width and maintain a mutual gap for receiving the substrate therein in contact with both contact surfaces, wherein the supply roller and counter-roller are each rotatable about their central axis and supply means are provided for supplying a liquid to the contact surface of the supply roller.

The invention also relates to a method for supplying a liquid to a substrate, particularly in the form of an optionally printed web, strip or sheet of substrate, wherein the substrate is guided in a gap between a supply roller and a counter-roller and is brought into contact with opposite contact surfaces of respectively the supply roller and the counter-roller, wherein at least the supply roller is provided on a periphery thereof with the liquid, and wherein the liquid of at least the supply roller is supplied to the substrate.

The invention relates particularly here to a coating device, also referred to below as coater, and method for application on a substrate of for instance paper, cardboard, textile or plastic for or of a printing device for the purpose of depositing, single-sided or double-sided, a uniform coating of the relevant liquid over a whole surface of the substrate. Digital printing techniques, such as inkjet printing, which make use of water-based inks, particularly require a customized treatment of the paper with a specific primer in order to achieve and maintain an acceptable printing quality at an acceptable level of ink consumption.

With a view thereto, printing companies can buy pretreated inkjet paper directly from their paper supplier, but are in that case often faced with a considerable additional charge. Moreover, such a more or less uniformly pretreated inkjet paper is often not optimally adapted to the printing process to be applied, which may be detrimental to the printing quality.

It is an alternative to provide bare, untreated paper with a uniform coating prior to the printing process, which coating can in that case be optimally adapted to the printed material and which can result in a considerable saving in paper costs. A coating device of the type described in the preamble can be utilized for this purpose. The use of such a coating device, usually referred to as coater, allows the use of accurately selected liquids to thereby provide the paper before or after the printing process with respectively a suitable primer or glossy layer over the whole surface. This generally results in an optimal printing quality and lower ink consumption.

Commercial printed materials, such as glossy magazines, product brochures and other high-end commercial printed materials, particularly requires a high-gloss, luxurious appearance which can thus be provided immediately following the printing process by covering with a suitable glossy coating (varnish). This is not just limited to printed materials on the basis of water-based inks but, irrespective of the applied printing technique, can for instance also be applied for offset printing. Such a glossy coating applied afterwards moreover protects the paper against mechanical load, for instance when it is folded, and against the influence of atmospheric/climatological conditions to which the printed material is exposed.

A device of the type described in the preamble which serves for this purpose is for instance known from International patent application WO 2013/160289. The coating device described therein is particularly intended for sheets or strips of desired substrate material, usually paper, plastic or cardboard, which are at least initially in a flat state and in this state are provided with a suitable glossy layer or other coating. The known coating device comprises for this purpose a roller assembly of a coating roller and a counter-roller between which the substrate is guided in pressure contact with the peripheral surfaces of the two rollers which serve as contact surfaces. At least the coating roller is here provided with supply means whereby a controlled quantity of the liquid for applying is applied to the contact surface of the coating roller so that this quantity will be at least partially supplied in a uniform layer to the adjacent lateral side of the substrate.

In the known device the supply means are formed by a dosing unit which is provided upstream of the supply roller. The dosing unit comprises a reservoir with the liquid to be applied, which is here in contact with a pick-up roller (fountain roller). The pick-up roller is in rotating contact with an intermediate roller and in each case takes up an excess quantity of liquid from the reservoir. The intermediate roller is a so-called anilox roller and is able and configured in turn to in each case pick up an accurately dosed quantity of liquid from the pick-up roller. The anilox roller is in turn in rotating contact with the contact surface of the supply roller in order to transfer the liquid thereto in the form of a continuous layer with a uniform layer thickness.

The printing device increasingly often comprises a digital printer for sheets which is capable of production in flexible manner and in limited runs. An emerging market is here that of printing packagings. The printer must here be able to quickly make changes in at least parts of the printed patterns, sometimes even after each printing. Compared to the relatively long and regular print runs with traditional web-fed printing presses, printed material from a sheet-fed digital printer is therefore often characterized by an irregular output and relatively short runs. This results in regular interruptions of the printing process for adjustment of the printer, which often also necessitates adjustment to greater or lesser extent of the equipment used before and/or after the printer. An example hereof is for instance an altered substrate width, to which the coating device must also be adapted in that case by a corresponding adjustment of a width of the contact surfaces. This is not only limited to digital printing on separate sheets, but is also the case in rotary printing on a continuous strip of substrate material.

In the known coating device this requires a change of the rollers present therein, or at least a cover thereof, in order to adapt a length of a contact surface thereof to an altered substrate width. This is particularly time-consuming, which already results in a loss of productivity and efficiency. Different roller assemblies, each for a different substrate width, must moreover be kept in storage. Not only do provisions have to be made therefor; this furthermore results in considerable costs, especially if relatively expensive anilox rollers are involved therein. All in all, this results in a considerable increase of the printing costs.

The present invention has for its object, among others, to provide a coating device and method which allow a relatively quick and simple changeover of a contact surface width.

In order to achieve the intended object a coating device of the type described in the preamble has the feature according to the invention that at least the contact surface of at least one of the supply roller and the counter-roller is axially adjustable along the central axis thereof, and that adjusting means are provided for aligning an edge of the contact surface of the at least one of the supply roller and the counter-roller with a first longitudinal side of the substrate, wherein an opposite edge of the other of the supply roller and the counter-roller is aligned with an opposite, second longitudinal side of the substrate. The substrate thus lies clamped between the coating roller and the counter-roller where their contact surfaces overlap each other. The degree (i.e. width) of this overlap can be set by adjusting the axial position of the contact surface of at least one of the coating roller and the counter-roller, while the opposite longitudinal side of the substrate and that of the other roller are also or will also be aligned.

In order to achieve the intended object a method of the type described in the preamble has the feature according to the invention that at least the contact surface of at least one of the supply roller and the counter-roller is axially adjusted along a central axis thereof, and a first edge of the contact surface of that roller is aligned with a first longitudinal side of the substrate, wherein an opposite edge of the contact surface of the other of the supply roller and the counter-roller is or will be aligned with the opposite, second longitudinal side of the substrate. The other of the supply roller and the counter-roller can here be disposed more or less fixedly, wherein the edge of its contact surface has a fixed setting and alignment with the relevant longitudinal side of the substrate or the substrate is aligned therewith. A particular embodiment of the method however has the feature according to the invention that at least the contact surface of both the supply roller and the counter-roller is adjusted axially along a central axis of the relevant roller, wherein a first edge of the contact surface of the one roller is aligned with the first longitudinal side of the substrate, and the opposite edge of the contact surface of the other of the supply roller and the counter-roller is aligned with the second longitudinal side of the substrate.

An edge of a contact surface is here understood to mean an end surface of the relevant contact surface, i.e. the outermost border of that contact surface transversely of the central axis of the relevant roller. The opposite edges of said rollers are here the edges of the respective rollers lying diagonally opposite each other. The opposite longitudinal sides of the substrate define a substrate width in that this extends therebetween. It is further noted that where reference is made in the present application to "aligning", this is understood to mean both an exact lining up, wherein the relevant edges coincide exactly with the relevant longitudinal sides of the substrate, and an alignment wherein, although an intended positional relation is imposed between the position of opposite edges of the contact surfaces relative to the relevant longitudinal sides of the substrate, a certain, defined distance is intentionally maintained therebetween. The opposite longitudinal sides of the substrate can in practice particularly lie a short distance, for instance in the order of one or several millimetres, outside the adjacent edges of the relevant contact surfaces.

According to the present invention, due to their mutual overlap the supply roller and the counter-roller define a gap width over which the substrate can be received therebetween and the liquid can be applied. According to the invention, this gap width can be set by axially adjusting the at least one of the supply roller and the counter-roller so that an edge of that roller is aligned with a first longitudinal side of the substrate, while the opposite edge of the other roller is also or will also be aligned with the adjacent, opposite longitudinal side of the substrate. The gap width can thus be adapted in relatively simple manner to a current substrate width. Although a gap width can here be selected which is slightly greater than the substrate width, a particular embodiment of the device and method according to the invention has the feature that the gap width is at most equal to the substrate width. For this purpose a particular embodiment of the method according to the invention has the feature that the edge of the contact surface of the at least one roller is lined up with the relevant longitudinal side of the substrate so that the opposite edges of the contact surfaces of the supply roller and the counter-roller at least substantially coincide with respectively the first longitudinal side and the second longitudinal side of the substrate.

A preferred embodiment of the device and method according to the invention has the feature here that the gap width is smaller than the substrate width. For this purpose a preferred embodiment of the method according to the invention has the feature that the edge of the contact surface of the at least one roller is lined up with the relevant longitudinal side of the substrate so that the opposite edges of the contact surfaces of the supply roller and the counter-roller fall inside, particularly fall just inside, respectively the first longitudinal side and the second longitudinal side of the substrate.

In these cases an outermost edge of the contact surface of the supply roller and an opposite outermost edge of the counter-roller substantially coincide with the relevant longitudinal sides of the substrate, or said edges of the rollers both lie inside these longitudinal sides of the substrate. By thus having the edges of the rollers and the longitudinal sides of the substrate coincide with each other, or positioning each of the edges of the rollers inside the adjacent longitudinal side of the substrate, it is avoided that the edges of the substrate cut into the contact surfaces of the rollers during operation. Premature wear of the rollers due to an effect of the edges of the substrate thereon can thus be prevented.

In a further preferred embodiment the device according to the invention is characterized here in that at least the contact surface of each of the supply roller and the counter-roller is axially adjustable, and that second adjusting means are provided in order to align an edge of the contact surface of the other of the supply roller and the counter-roller with a second longitudinal side, lying opposite the first longitudinal side, of the substrate. In that case it is not only the degree of, but also the position of the overlap that can be set by aligning both the coating roller and the counter-roller with their contact surface with the respective longitudinal sides of the substrate. Not only the width but also the position of the overlap between the contact surfaces can hereby be adapted to that of the substrate. An extremely flexible and practical coating device is hereby obtained, an operative coating width of which can always be adapted to the substrate in question without the rollers necessarily having to be switched, simply by a correct setting of a width of the overlap of their contact surfaces.

The coating device according to the invention can always be adapted to one current substrate width by setting a corresponding overlap between the contact surfaces of the supply roller and the counter-roller. This can be done manually, but also in motorized manner. The overlap is created by an axial adjustment of the contact surfaces relative to each other. The contact surface for adjusting can here be adjusted relative to the roller to which it belongs, for instance by using thereon a cover which is axially displaceable over a core of the roller. A particular embodiment of the coating device however has the feature according to the invention that at least the at least one, and preferably each, of the supply roller and the counter-roller is axially adjustable together with the contact surface thereof in order to align an edge of the contact surface with a longitudinal side of the substrate. Such an adjustment, wherein the relevant roller as a whole performs the requested axial adjustment, appears to be easily feasible in the construction, wherein an extremely high precision of the lining up of the edge of the contact surface and the relevant longitudinal side of the substrate can furthermore be achieved.

A further particular embodiment of the coating device according to the invention has the feature that the at least one of the supply roller and the counter-roller comprises at least the supply roller and that the supply means are axially displaceable together with the supply roller. In a further particular embodiment the coating device according to the invention is here characterized in that the supply means are accommodated together with the supply roller fed thereby in a shared frame, which frame is coupled to the adjusting means for the purpose of performing an axial displacement parallel to the central axis of the supply roller. The supply means are thus axially displaceable together with the supply roller, whereby a liquid transport to the supply roller can remain unchanged. This is because the liquid transport in this case co-displaces at least partially with the supply roller, whereby interfaces between successive components during an axial adjustment of the whole do not change with respect to one another.

With a view to a simultaneous two-sided coating of the substrate a preferred embodiment of the coating device according to the invention has the feature that the counter-roller comprises a second supply roller and is provided with second supply means for supplying a second liquid, optionally differing from the first liquid, to the second contact surface. The supply system can here as it were be mirrored on either side of the substrate, so that the two lateral sides of the substrate can receive the same treatment or will each receive a separate liquid coating, subject to the concrete requirements of the case. It is also important that direct contact between wet contact surfaces is avoided here. It has been found that a part of the film of the liquid which is situated on the contact surface outside the overlap remains thereon in stable state and does not cause any spraying or spattering during the rotation of the roller. This would be different if the wet contact surfaces were able to 'see' or even physically touch each other.

A further preferred embodiment of the coating device has the feature according to the invention that the supply means comprises a dosing unit, which is accommodated together with the supply roller fed thereby in the frame shared therewith, comprising a reservoir for holding a quantity of a liquid for supplying, and a pick-up roller which is arranged rotatably about a central axis thereof and comprises over a periphery thereof a take-up surface, and is able and configured to therewith enter into contact with a liquid held in the reservoir, wherein the pick-up roller and the supply roller are coupled to each other for the purpose of at least partially transferring the liquid from the take-up surface of the pick-up roller to at least substantially the whole contact surface of the supply roller.

A relevant part of the supply system is formed here by a dosing unit which as such is arranged together with the supply roller in a shared frame.

A further embodiment has the feature here that the dosing unit comprises at least one transfer roller between the pick-up roller and the supply roller, which is arranged for rotation about a central axis thereof, and that the pick-up roller and the supply roller are coupled to each other with interposing of the at least one transfer roller for the purpose of transferring the liquid from the take-up surface of the pick-up roller to at least substantially the whole contact surface of the supply roller. Such a transfer roller comprises particularly a contact surface which is provided with a regular pattern of impressions (cells or dimples), a density, depth, shape and cross-section of which were accurately determined in order to thereby ensure a highly accurate liquid transfer, which results in a controlled and uniform film thickness on the contact surface and finally produces a ditto coating on the substrate. Such a roller is usually referred to as anilox roller or roll.

The axial adjustment and adaptation of the contact surface or the contact surfaces to the longitudinal side of the substrate can per se be performed manually. A further preferred embodiment of the device however has the feature that the adjusting means comprise one or more actuators and a control device, which actuators are individually controllable by the control device. A further embodiment of the device according to the invention is characterized here in that the actuators comprise one or more linear actuators with a linearly extendable drive rod which is coupled directly or indirectly to the relevant roller, particularly selected from a group of screw spindle/threaded cavity assemblies and pressure cylinders, particularly hydraulically or pneumatically fed pressure cylinders.

The adjustment can thus take place in fully powered (motorized) manner, wherein the actuators are extended until the edge of the relevant contact surface accurately coincides with the relevant longitudinal side of the substrate. The control device can particularly be provided with a user interface, particularly a user interface provided with a screen and input means, whereby an operator can enter possible settings and has control over the adjustment.

With a view to a fully automatic lining up of the edges of the contact surfaces with the relevant longitudinal sides of the substrate a further preferred embodiment of the device has the feature according to the invention that the control device is coupled to one or more sensors, particularly one or more optical sensors, which are able and configured to detect the first and second longitudinal side of the substrate, and that the control device is able and configured to extend one or more actuators on the basis of the longitudinal side detected by a sensor in order to align the edge of the contact surface of the relevant roller with the longitudinal side of the substrate detected by the sensor. The optical, acoustic or otherwise suitable sensors here continuously detect the position of the longitudinal sides of the substrate and send this information to the control device. This can react hereto by controlling the actuators, if necessary, in order to perform a correction of the lining up of the edges of the contact surfaces or, in the case of a change in substrate, impose a setting newly adapted thereto.

The invention will be further elucidated hereinbelow with reference to an exemplary embodiment and an accompanying drawing. In the drawing.

It is otherwise noted here that the figures are purely schematic and not always drawn to (the same) scale. Some dimensions in particular may be exaggerated to greater or lesser extent for the sake of clarity. Corresponding parts are designated in the figures with the same reference numeral.

Figure 1:
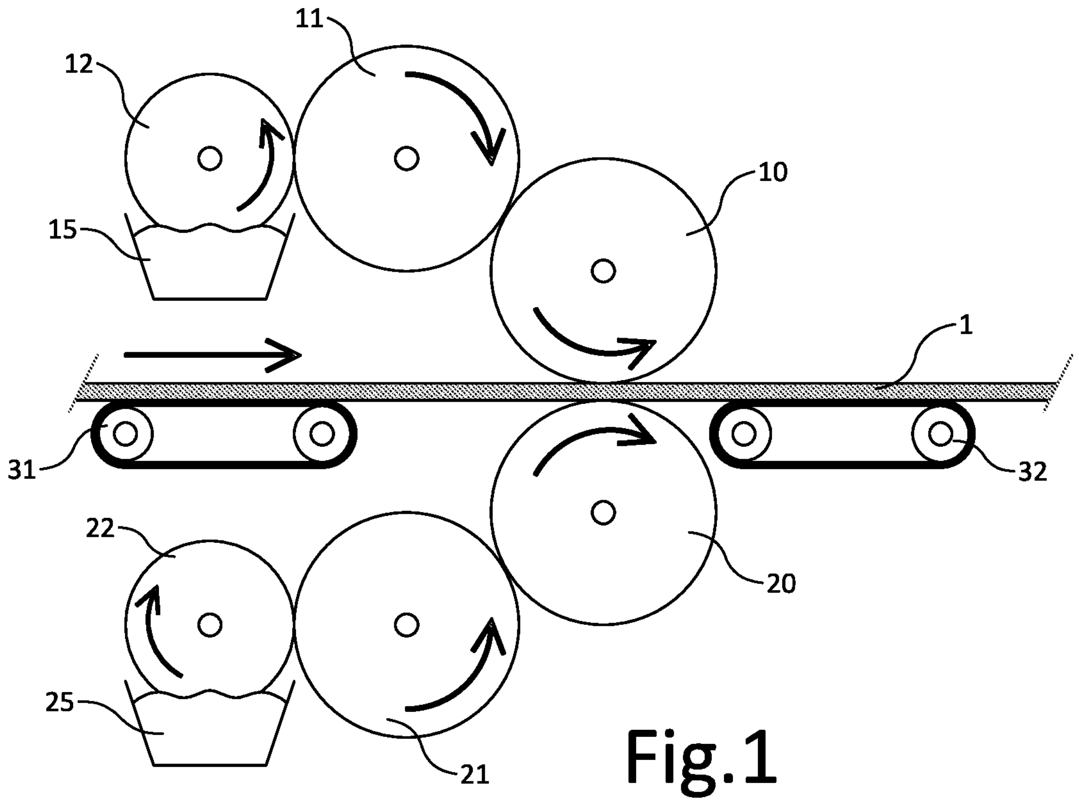
FIG. 1 shows a schematic representation of a roller system in an exemplary embodiment of the coating device according to the invention in side view.

FIG. 1 shows schematically a general setup of a coating device according to the invention. The coating device, also referred to as coater, can be applied to a substrate 1 in the form of individual strips of sheets, but can also be applied in a continuous printing process wherein the substrate 1 is formed by a long strip of substrate material which was unwound from a roll. Substrate 1 is guided into the device with infeed and throughfeed means 31, 32 provided for this purpose, and passes therebetween a set of rotating rollers 10, 20. At least one of the rollers 10, 20 is here a supply roller and is provided with supply means 11, 12, 15 whereby a liquid for applying can be applied to a lateral side of the substrate.

In this example the supply means comprise a reservoir 15 for holding therein a quantity of the liquid for applying, wherein a pick-up roller 12, usually referred to as fountain roller, enters into contact with the liquid. Pick-up roller 12 takes up an excess of liquid from reservoir 15 and is in turn in contact with an intermediate roller 11 which picks up a controlled quantity of liquid from pick-up roller 12. The intermediate roller can for this purpose be embodied with a carefully selected relief pattern of impressions (dimples), a shape, depth, size and density of which determine a take-up capacity. Such a roller is usually referred to as anilox roller. The present invention is however also suitable for a roller system wherein use is made of a smooth cylinder for the intermediate roller. It is optionally also possible to dispense with an intermediate roller, wherein use is for instance made of an anilox roller for the pick-up roller. In that case a possible surplus of liquid can be wiped off with a blade which is arranged in sliding contact with the relevant cylinder just after the contact with the liquid, optionally supplemented with a corresponding blade just before the contact with the liquid. More than one intermediate roller can also be applied, if desired.

All rollers 10, 11, 12, 20 are suspended rotatingly and motor-driven. The rotation directions are shown schematically in the figure. A peripheral speed of the rollers will usually be adjusted to a web speed or throughfeed speed of substrate 1, although a certain slip can be imparted here between successive contact surfaces by selecting a slightly higher or slightly lower peripheral speed than the adjacent contact surface. The rollers are usually embodied in steel, wherein a specific modified layer in the form of a carefully selected relief and/or a differing composition and/or material can be provided at the contact surface.

Finally, the liquid is transferred to the contact surface of supply roller 10 in the form of a thin film with a uniform thickness. The supply roller maintains a narrow gap with a counter-roller 20, such that the substrate 1, particularly paper, cardboard or plastic, is received therebetween under a certain pressure and the liquid film of supply roller 10 is transferred to the substrate at least substantially wholly and over the whole surface. The liquid provides for instance a glossy layer and comprises for this purpose a water-based or solvent-based varnish which is applied after a printing. The liquid can however also comprise a primer which is provided on the substrate prior to a printing, particularly in the case of paper or cardboard, in order to better adapt the substrate material and the ink to be applied to each other. The printing result can be improved here, and the ink consumption limited. The shown device can for instance also be applied downstream of a dryer for the printed material for the purpose of (re)humidifying and siliconization the substrate. And the device can also be utilized advantageously in other stages of a printing process.

Although a stand-alone smooth roller suffices in principle for counter-roller 20 in order to provide a counter-pressure to supply roller 10, a second supply roller is advantageously applied therefor, as in the shown example. This is provided in similar manner to first supply roller 10 with supply means 21, 22, 25, for a description of which reference is therefore made to the first supply means 11, 12, 15. For the second supply means use can be made here of the same liquid, although a different liquid or liquid composition can if desired also be applied for this purpose. The supply roller assembly 10, 20 thus provides the option of coating substrate 1 with a uniform liquid film on two sides in a single pass. It is here possible particularly to use a different liquid (composition) for a printed side or side to be printed than for an unprinted or more printed or less printed side.

Figure 2:
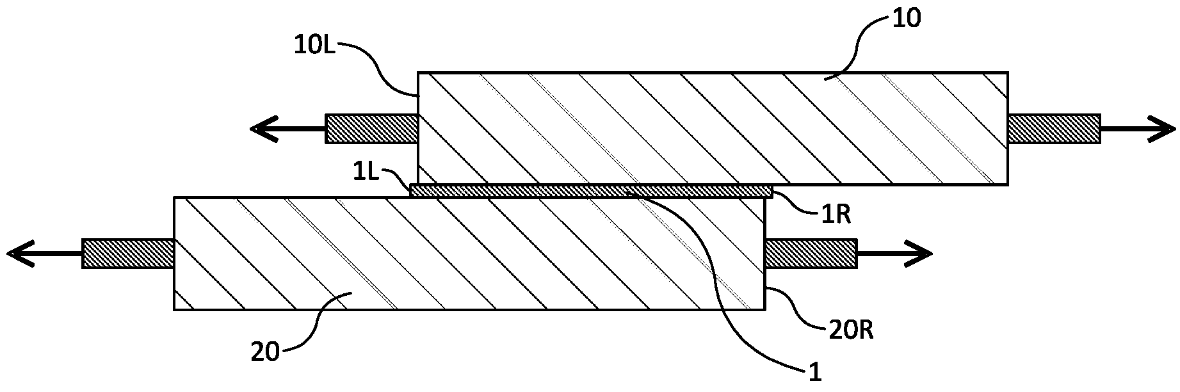
FIG. 2 shows a top view of the supply rollers of the system of FIG. 1.

In order to enable the device to adapt itself to an actual substrate width at least one of the supply roller 10 and the counter-roller 20 is laterally, axially adjustable with its contact surface along a central axis of the relevant roller. In this example the two supply rollers 10, 20 are embodied as such for axial adjustment, which is shown schematically in FIG. 2. This provides the option of adequately aligning a left-hand edge 10L of first supply roller 10 with the corresponding left-hand longitudinal side 1L of the substrate, and likewise aligning the right-hand edge 20R of the second supply roller with the right-hand longitudinal side 1R of the substrate in the same way. The width and position of the thus created overlap between the contact surfaces of the two supply rollers 10, 20 can thus in each case be adapted to an actual substrate width, without components having to be removed and switched for this purpose.

It has been found desirable here in practice to maintain a small margin in the order of one or several millimetres of the contact surface inside the longitudinal side of the substrate. The longitudinal side 1L, 1R of substrate 1 thus lies (just) clear of the respective contact surface 10, 20, whereby the longitudinal sides 1L, 1R will not experience any pressure from the rollers and will not cut into the contact surface 10, 20. It is also important here that direct contact or sight between the wet contact surfaces of the two supply rollers 10, 20 is thus avoided, as this could otherwise result in direct liquid-liquid contact resulting in undesired spraying or spattering. Substrate 1 is located where rollers 10, 20 'see' each other, and where substrate 1 is not located, rollers 10, 20 do not 'see' each other. This provides a particularly practical and flexible arrangement whereby it is possible to anticipate a varying substrate width in rapid and simple manner.

Figure 3:
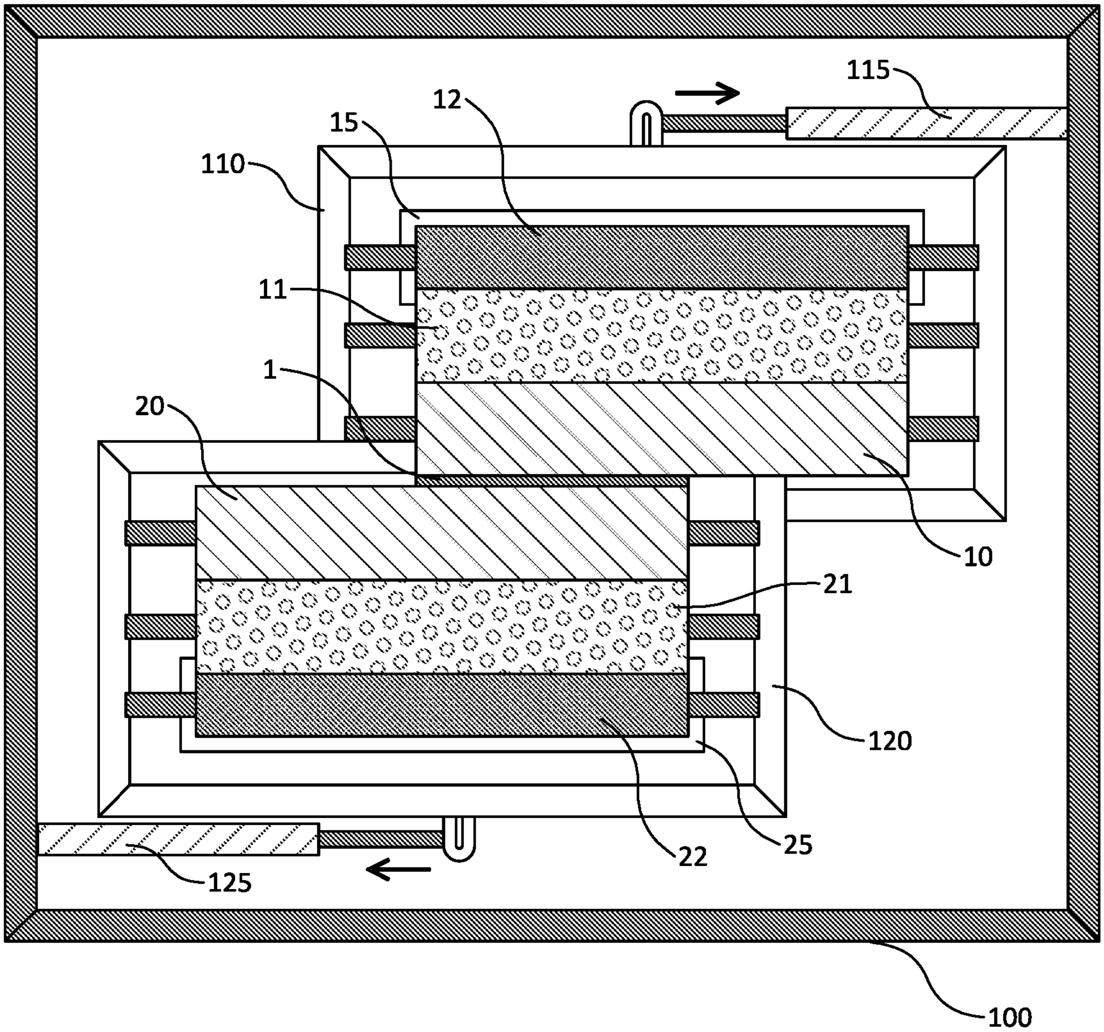
FIG. 3 shows a top view of the dosing and supply system of FIG. 1.

In this example the respective supply means 11, 12, 15 and 21, 22, 25 for each of the two supply rollers 10, 20 form an independent dosing unit and are as such accommodated together with the supply roller 10, 20 to be fed thereby in a shared frame 110, 120, see FIG. 3. This frame 110, 120 forms as it were a cartridge having therein the dosing unit and the supply roller for the relevant side of substrate 1. The relevant cartridge 110, 120 is laterally displaceable as a whole by means of a linear actuator 115, 125 provided for this purpose. The overlap between the two supply rollers 10, 20 can thus be set by a corresponding lateral displacement of the relevant cartridge 110, 120 relative to the adjacent, fixed frame 100 of the device.

Actuators 115, 125 are for instance hydraulically or pneumatically controlled pressure cylinders, but can for instance also be formed by screw spindles which engage operatively inside threaded cavities provided for this purpose. If desired, all this can be controlled on the basis of predetermined preferred positions. These can for instance be imposed by a control device which is not further shown, and be entered by an operator. For this purpose the control device can be coupled to a user interface in the form of a screen with input means, whereby a setting of an actual substrate width and the overlap between the rollers 10, 20 corresponding therewith can be entered. Optical, acoustic or other sensors can optionally be provided here, which continuously monitor a correct mutual lining up of respectively roller edge 10L and substrate side 1L, and 20R and 1R, and generate a signal to the control device on the basis of which it can make adjustments, if necessary, when a variation is detected.

All in all, the invention thereby provides an extremely practical and valuable additional functionality to a coating device which can be utilized particularly universally. Although the invention has been further elucidated above on the basis of only a single exemplary embodiment, it will be apparent that the invention is by no means limited thereto. On the contrary, many variations and embodiments are still possible within the scope of the invention for a person with ordinary skill in the art.

Use is thus made in the example of a dosing unit wherein the liquid is transferred from the pick-up roller to the supply roller by means of an intermediate roller. This is in particular what is usually referred to as a metering system. The pick-up roller comprises here a fountain roller and the intermediate roller an anilox roller, while a smooth cylinder is applied for the supply roller. An intermediate roller can however also be dispensed with in practice, wherein there will be direct contact between the pick-up roller and the supply roller. This is in particular what is usually referred to as a doctoring system, wherein the pick-up roller comprises an anilox roller and the supply roller a smooth cylinder. It is also possible to apply more than one intermediate roller.

Instead of a double-sided system, as described on the basis of the exemplary embodiment, the invention can advantageously also be applied for a single-sided coating, wherein the counter-roller will then usually be a smooth cylinder without further dosing and supply means for a liquid.

The invention claimed is:

1. A coating device for supplying a liquid to a substrate, comprising a supply roller having over a periphery thereof a first contact surface, and a counter-roller placed opposite the supply roller and having over a periphery thereof a second contact surface substantially parallel to the first contact surface, wherein said first and second contact surfaces are at least a substrate width in width and maintain a mutual gap for receiving the substrate therein in contact with both said first and second contact surfaces, wherein the supply roller and counter-roller are each rotatable about their central axis and supply means are provided for supplying a liquid to the contact surface of the supply roller, wherein at least the contact surface of at least one of the supply roller and the counter-roller is axially adjustable along the central axis thereof, and wherein adjusting means are provided for aligning an edge of the contact surface of the at least one of the supply roller and the counter-roller with a first longitudinal side of the substrate, wherein an opposite edge of the other of the supply roller and the counter-roller is aligned with an opposite, second longitudinal side of the substrate.

2. The coating device according to claim 1, wherein at least the contact surface of each of the supply roller and the counter-roller is axially adjustable, and wherein second adjusting means are provided in order to align an edge of the contact surface of the other of the supply roller and the counter-roller with a second longitudinal side, lying opposite the first longitudinal side, of the substrate.

3. The coating device according to claim 1, wherein at least the at least one, of the supply roller and the counter-roller is axially adjustable together with the contact surface thereof in order to align an edge of the contact surface with a longitudinal side of the substrate.

4. The coating device according to claim 1, wherein the at least one of the supply roller and the counter-roller comprises at least the supply roller and wherein the supply means are axially displaceable together with the supply roller.

5. The coating device according to claim 4, wherein the supply means are accommodated together with the supply roller fed thereby in a shared frame, that is coupled to the adjusting means for a purpose of performing an axial displacement parallel to the central axis of the supply roller.

6. The coating device according to claim 1, wherein the counter-roller comprises a second supply roller and is provided with second supply means for supplying a second liquid, optionally differing from the first liquid, to the second contact surface.

7. The coating device according to claim 1, wherein the supply means comprises a dosing unit, which is accommodated together with the supply roller fed thereby in the frame shared therewith, the dosing unit comprising a reservoir for holding a quantity of a liquid for supplying, and a pick-up roller which is arranged rotatably about a central axis thereof and comprises over a periphery thereof a take-up surface, and is able and configured to therewith enter into contact with a liquid held in the reservoir, wherein the pick-up roller and the supply roller are coupled to each other for a purpose of at least partially transferring the liquid from the take-up surface of the pick-up roller to at least substantially a whole contact surface of the supply roller.

8. The coating device according to claim 7, wherein the dosing unit comprises at least one transfer roller between the pick-up roller and the supply roller, which is arranged for rotation about a central axis thereof, and wherein the pick-up roller and the supply roller are coupled to each other with interposing of the at least one transfer roller for a purpose of transferring the liquid from the take-up surface of the pick-up roller to at least substantially the whole contact surface of the supply roller.

9. The coating device according to claim 1, wherein the adjusting means comprise one or more actuators and a control device, which the one or more actuators are individually controllable by the control device.

10. The coating device according to claim 9, wherein the one or more actuators comprise one or more linear actuators with a linearly extendable drive rod which is coupled directly or indirectly to a relevant roller.

11. The coating device according to claim 9, wherein the control device is coupled to one or more sensors, which are able and configured to detect the first and second longitudinal side of the substrate, and wherein the control device is able and configured to extend the one or more actuators on the basis of the longitudinal side detected by a sensor of the one or more sensors in order to align the edge of the contact surface of a relevant roller with the longitudinal side of the substrate detected by the sensor.

12. The coating device according to claim 1, wherein said substrate is in the form of web, strip or sheet.

13. The coating device according to claim 1, wherein each of the supply roller and the counter-roller is axially adjustable together with the contact surface thereof in order to align an edge of the contact surface with a longitudinal side of the substrate.

14. The coating device according to claim 10, wherein the one or more actuators are selected from a group of screw spindles, threaded cavity assemblies and pressure cylinders.

15. The coating device according to claim 14, wherein the one or more actuators are hydraulically or pneumatically fed pressure cylinders.

16. The coating device according to claim 11, wherein the one or more sensors are optical sensors.

* * * * *